Patented Oct. 4, 1932

1,880,601

UNITED STATES PATENT OFFICE

FREDERICK H. UNTIEDT, OF CHEVY CHASE, MARYLAND

GYPSUM-RUBBER COMPOSITION

No Drawing. Application filed May 26, 1931. Serial No. 540,217.

This invention relates to gypsum-rubber compositions and it comprises porous or cellular products containing fifty percent or more of gypsum together with sufficient rubber to render the products flexible and non-rigid.

It is an object of this invention to prepare porous or cellular products having the advantageous characteristics of set (hydrated) plaster of Paris and of rubber. Plaster of Paris (calcined gypsum) is a very useful constructional material. When it sets, however, it forms a hard, fracturable and non-flexible, rigid material. Its usefulness in certain relations would be markedly increased if its set product could be made flexible to a certain degree.

Porous or cellular plasters or plaster board have been used to some extent for heat insulation and sound deadening purposes. These materials, in common with ordinary non-cellular plaster board, are hard, stiff and fracturable, rendering them useful only on flat surfaces. Were such a cellular plaster board, that is, a material formed between paper liners, rendered flexible, pliable and elastic to a certain degree its utility would be markedly increased. Such a flexible material could be bent around joists and "tucked in" in much the same way that fibrous insulating "blankets" or "quilts" are used.

I have now discovered that set cellular or porous plaster compositions having flexibility to a greater or less degree, depending upon the character of the composition, can be prepared. My invention includes the use of aqueous stable dispersions of rubber in conjunction with a calcined gypsum such as plaster of Paris. I find, for example, that a cellular set (hydrated) plaster containing twenty percent of rubber derived from an aqueous dispersion such as latex in the manner to be described has such flexibility that a sheet thereof, having a thickness of a quarter to half an inch or more can be bent double without fracture.

I have further discovered that plaster of Paris can be added to a stable aqueous rubber dispersion and the mixture aerated and agitated, and that the plaster will hydrate and "set" in the presence of the rubber without noticeably coagulating the rubber. When dried, the resulting product comprises a cellular or porous set plaster of Paris (actually gypsum) and dried latex rubber uniformly distributed therethrough. Products of this character are better than those containing coagulated rubber because dried latex solids have better mechanical and chemical properties.

My invention can be practised in a number of ways and the amount of rubber or the gypsum-rubber ratio in the set cellular product can vary over wide limits from a product containing but ten percent of rubber to one containing ninety per cent of rubber.

The aqueous rubber dispersion, which consists of rubber dispersed in water and is advantageously a natural rubber latex, concentrated to 72 to 76 percent rubber, or the normal 35 percent latex, must contain agents which stabilize the rubber therein against immediate coagulation in the presence of the plaster of Paris. Calcium sulphate tends to coagulate such latices but if soap, saponin, or other "protective" colloids, be present, such coagulation does not occur. There are highly stabilized latices on the market which are suitable. Other dispersions, such as the "synthetic" latices made from crude rubber can also be used.

To prepare a cellular or porous product having flexibility and containing twenty percent of rubber, I proceed as follows: Twenty-four parts of plaster of Paris (calcined gypsum) are mixed with thirty-five parts of water and to the mixture I add four-tenths parts of saponin or other stabilizing agent. The resulting aqueous mixture is then mixed with eight parts of a concentrated latex containing about 75 percent of rubber. The mixture is then aerated and agitated to include finely divided bubbles of air and convert it to a thick, dense foam and then allowed to set and dry.

Another mixture, prior to aerating, agitating, and setting advantageously contains sixteen parts of a seventy-five percent latex, twenty-four parts of plaster of Paris, thirty-five parts of water and four-tenths parts of saponin. This will give a product containing about thirty-three percent rubber.

Still another consists of sixty-five parts latex, twenty-four parts plaster of Paris, thirty-five parts of water and one part of saponin which will yield a product containing sixty-six percent of rubber.

To obtain a cellular or porous composition containing about ten percent of rubber, I advantageously mix one-half part of a 70 to 75 percent latex with three parts of plaster of Paris suspended in three parts of water to which about four-tenths parts of saponin have been added, the resulting mixture then being aerated and agitated or "whipped", in the manner described, the foam spread out in a layer, and dried.

In each of the foregoing examples, the latex and aqueous mixture of plaster of Paris are mixed together and aerated or "whipped" before the plaster has had time to set.

In aerating the mixture I "whip" or otherwise aerate and agitate the mixture of latex, plaster of Paris, water, and saponin for about five minutes, the actual time depending in part upon the efficiency of the agitating device used. This gives me a thick, dense, somewhat "stiff" foam in which the bubbles of air are minute. The mass is much like well beaten cream. The foam can then be allowed to stand at room temperature and setting is complete in a day or so. The set product is light, porous or cellular, and flexible.

In the case of products containing upwards of thirty percent of rubber, the foam can be dried in a few minutes at an elevated temperature, about 70° C., provided the layer of foam is not too thick. A half inch thickness of foam will dry at this temperature rapidly and with practically no destruction of its cellular characteristics. The foam can be molded in molds of various shapes and thicknesses and dried at higher temperatures provided the mold prevents the expansion of the foam or "blowing up" during the heating.

Three factors appear to govern the character of the final product as regards strength, flexibility, and porosity. These factors are the amount of water in the mixture prior to setting, the amount of plaster of Paris, and the amount of rubber. There appears to be nothing critical about the amount of stabilizing, or foam stabilizing agent, for example saponin, that should be present. One or two percent based on the remainder of the composition, is adequate.

Increasing the quantity of water, when making an aerated cellular or porous product, increases the volume of foam and hence increases the bulk of the final material. This naturally decreases its apparent density. But the decrease in density is generally accompanied by a decrease in the strength of the material. This can be counteracted by increasing the amount of rubber. In general, I use considerably more water than that which, when mixed with the plaster, would give a thick paste. Ordinary set plasters are made by using about double the quantity of water theoretically required to combine with the calcined gypsum and the mixture is a thick paste. My aqueous mixtures of plaster of Paris and water prior to adding the latex are thin flowing suspensions and such a suspension, if converted to a foam in the absence of the latex, would yield a dry cellular product which can be readily crumbled and possesses no usefulness as a structural material.

Increasing the quantity of plaster of Paris, the rubber being kept constant, tends to give a material having less flexibility whereas if the rubber is increased, the flexibility increases.

Pore size is in part dependent upon the quantity of water present. When much water is present, the density, in the final product, decreases as stated. But during the setting period, the bubbles tend to enlarge somewhat so that the bubble size increases. If the quantity of rubber be increased, the pore size decreases and when mixtures containing thirty percent or more of rubber are prepared, the product is virtually microporous.

Pore size can be regulated from a product having large pores, much like ordinary sponge rubber to one having minute pores not discernible with the naked eye.

By a judicious control of water, rubber (in dispersed form) and plaster of Paris, one can obtain cellular or porous products of any desired character. Increasing the rubber up to sixty-six per cent or more gives a material which is, to all appearances, spongy rubber. But it should be noted here that in this invention, the gypsum is not present as a mere filler, as by adding gypsum to rubber, but is present as a gypsum formed by the setting of plaster of Paris in the presence of the rubber. This is important because my products have characteristics different from those merely composed of rubber with which gypsum has been mixed.

There are a number of ways of preparing vulcanized products. Instead of using a latex, I can use vulcanized latex, or I can mix sulphur, zinc oxide, and accelerators with the latex, in ways well known, prior to mixing the latex with the plaster. On heating such a mixture, or its set product, the rubber is vulcanized.

Alternatively, I use an ordinary concentrated latex in the manner previously described and then vulcanize the set product by a cold process. Either the sulphur chloride, or sulphur dioxide-hydrogen sulphide method can be used.

The latex stabilizing agent needs no extended comment. Most concentrated latices contain adequate amounts of stabilizing agent. Saponin is effective, so is soap, gelatin, etc. All that is necessary is that the stabilizing agent be present when the latex and calcined gypsum are mixed so as to prevent immediate coagulation of the rubber in the latex and thus permit intimate and uniform admixture of the ingredients. If, instead of adding the stabilizing agent to the latex, it be added to the suspension of calcined gypsum prior to incorporating the latex, the aqueous portion of the suspension (containing the stabilizing agent dissolved therein) together with the then added latex constitute an aqueous rubber dispersion which contains a stabilizing agent to restrain coagulation of the rubber when calcined gypsum is mixed therewith. When making my aerated products, it is best to add additional agent to increase the foaming qualities of the mixture and that is why I have included saponin in the above specific examples. Many latices already contain adequate quantities of foaming agents.

The foams obtained by my invention, are thick, dense, and relatively stable, and can be put to many uses. When making a flexible, cellular insulating material, the foam is advantageously spread between liners and allowed to dry out. The result is a gypsum insulating material which can be bent and tucked in inaccessible places. Stiffer "boards" can be made by spreading the foam between heavier fiber boards having some rigidity and this composite laminated material is useful in wall construction.

When the gypsum-rubber ratio is relatively large, say 4 or 5 to 1 in cellular products, the pore size, as stated, tends to increase. In such cases, I find that it is advantageous to compress the dried cellular or porous material to as much as a third of its original thickness. This decreases the pore size and also increases the flexibility. A product, in which the gypsum-rubber ratio is 4 to 1, and in which the pore size is relatively large will tend to fracture slightly when bent upon itself although such a material is flexible to a marked degree. But by compressing the product to a third of its original thickness, I can obtain a product still cellular but having greatly increased flexibility. This is an important feature of my invention.

Another major use for my invention is in making coated materials, the coating carrying large amounts of set plaster of Paris, and, in this respect, this invention is a continuation in part of, and is more specific than, the invention disclosed in my Patent No. 1,845,688.

I find that foams which will yield a set product containing as little as thirty three percent of rubber, the rest being gypsum, can be easily spread on a fabric in a layer say an eighth of an inch thick and quickly dried at a moderately elevated temperature say 70° C. This gives me a fabric coated with a dry porous or cellular coating analogous to the cellular or porous compositions described above. I then advantageously wash the fabric in water and, while wet, pass it between compression rolls to compress the coating and render it non-cellular. The final product, which, if desired can be vulcanized, is a waterproof flexible fabric, much like an ordinary rubberized fabric, but carrying large amounts of gypsum. It is, of course, inexpensive to manufacture and forms an excellent wall covering. It can be printed, painted, or otherwise decorated, and applied to wall surfaces in the same manner as wall paper. It also serves as a base for floor coverings, automobile tops etc.

In these coated fabrics, the rubber can of course be increased depending upon the uses to which the rubberized fabric is to be put.

Another use for the compositions made by this invention is in surfacing fiber wallboard to render the surface water resistant as well as give it a plaster surface. In this case, the wet foam is spread on the surface of the board, for example a bagasse type board, and then dried at 70° C. After the foam has dried, the porous or cellular, flexible, gypsum rubber composition thus obtained is then compressed by running the coated board between rollers or otherwise to break down the porous structure and to render the coating waterproof. An important advantage in this feature of the invention is in the fact that such coatings are flexible and hence do not crack should the board tend to warp after a period of use.

Various fillers, such as colored pigments, fibrous materials, dyestuffs, and non-cementitious mineral fillers can be added to the mixture of rubber dispersion, plaster of Paris and water before the mass is converted to a foam. One major advantage of my invention is that the fillers can be incorporated in the mixture and uniformly mixed therewith because the vigorous agitation which is employed to form the foam necessarily distributes the filler uniformly. It is ordinarily difficult to mix fillers with a concentrated latex without introducing some air bubbles although such is accidental and undesirable because the bubbles, which are of large size and are scattered at random throughout the pasty mass, make it difficult to secure uniform coatings. In my process, all of the mixture is deliberately converted to a thick foam in which the bubbles are minute and uniformly distributed. Fabric or paper coated with such a foam, dried, and compressed, yields a uniform even coating.

Fillers or pigments can also be incorporated in those products which are the result of drying and compressing the foam by dusting the filler or pigment on the dried foam layer before compressing and then compressing. This causes the pigment to be "rolled" into the coating and I find that very pleasing fanciful effects can be secured in this manner.

As a further alternative, I can make up foams of various colors, for example one containing a blue pigment and the other a red pigment and then mix the two colored foams together superficially so that the resulting mixed foam, when spread out to dry, has "marbled" or streaky bands of red and blue areas. This method is especially useful when coating fabrics with my latex-plaster of Paris foams.

Throughout this specification I have used "plaster of Paris" to denote a calcined gypsum having cementitious properties. It is to be understood that I do not restrict myself to pure plaster of Paris (calcium sulphate hemihydrate) but include "dead-burned" gypsum as well. Both are calcined gypsum products which will hydrate with water to form set products.

By the words "flexible" and "non-rigid" I mean to distinguish my compositions from hard, rigid, plaster boards. My compositions, as stated, can be readily bent and flexed without much fracture, except upon repeated flexing to deliberately break or crumble a strip of the composition. Any attempt to bend or flex a hard rigid plater board, cellular or otherwise, will, of course, break the board. My compositions are furthermore characterized by the ease with which they may be cut with an ordinary scissors or shears. This is a great advantage when the compositions are used in strip form as flexible materials for the heat and sound insulating of building structures since the compositions can be readily cut to the shape desired.

And, in the appended claims, the language "quantity of rubber being at least sufficient to impart flexibility and non-rigidity to the composition" means rubber in an amount generally not less than about ten percent of the total solids. This, it will be understood, is, however, a variable quantity depending upon the character of the rubber used. When making domestic heat insulating materials as substitutes for flexible fibrous insulation it is, of course, desirable to keep the cost of manfacture as low as possible. For this reason, the amount of rubber used should be the least quantity which will give the desired physical properties to the composition. Sufficient rubber, or similar flexible rubbery material, must be present to impart flexibility, non-rigidity and "binding qualities" to the composition so that its constituents hold together and do not crumble on ordinary handling. This quantity can be readily determined, when testing the usefulness of various dispersions of rubber or rubber-like materials, by simply making up small batches of the composition and varying the quantity of rubber until a cellular or porous composition having the desired physical properties is obtained.

What is claimed is:

1. A cellular or porous composition containing an intimate admixture of gypsum and the rubber solids of an aqueous rubber dispersion which contains a stabilizing agent to restrain coagulation of the rubber in said dispersion when the latter is mixed with calcined gypsum, said composition being non-rigid and flexible, and distended by the presence therein of air-filled cells or pores so as to be cellular or porous, the gypsum therein amounting to at least fifty percent of the total solids and the quantity of rubber being at least sufficient to impart flexibility and non-rigidity to the composition.

2. A cellular or porous composition containing an intimate admixture of gypsum and the rubber solids of an aqueous rubber dispersion which contains a stabilizing agent to restrain coagulation in said dispersion when the latter is mixed with calcined gypsum, said composition being non-rigid and flexible, and distended by the presence therein of air-filled cells or pores so as to be cellular or porous, the solids therein, other than rubber, amounting to approximately seventy to ninety percent of the total, the rubber amounting to approximately ten to thirty percent of the total, and at least fifty percent of the total solids being gypsum.

3. A cellular or porous composition containing an intimate admixture of gypsum and the rubber solids of an aqueous rubber dispersion which contains a stabilizing agent to restrain coagulation of the rubber in said dispersion when the latter is mixed with calcined gypsum, said composition being non-rigid and flexible, and distended by the presence therein of air-filled cells or pores, the gypsum therein amounting to at least fifty percent of the total solids and the quantity of rubber being at least sufficient to impart flexibility and non-rigidity to the composition, said composition being a dried foam, which foam, prior to drying and hydration of the calcined gypsum therein, contains rubber in aqueous dispersion and calcined gypsum.

4. A cellular or porous composition containing an intimate admixture of gypsum and the rubber solids of an aqueous rubber dispersion which contains a stabilizing agent to restrain coagulation in said dispersion when the latter is mixed with calcined gypsum, said composition being non-rigid and flexible, and distended by the presence therein of air-filled cells or pores so as to be cellular or porous, the solids therein, other than rubber, amounting to approximately seventy to ninety percent of the total, the rubber amounting to approximately ten to thirty percent of the total, and at least fifty percent of the total solids being gypsum, said composition being a dried foam, which foam, prior to drying and hydration of the calcined gypsum therein, contains rubber in aqueous dispersion and calcined gypsum.

5. The composition as in claim 1 wherein the rubber therein is vulcanized.

6. The composition as in claim 2 wherein the rubber therein is vulcanized.

7. The composition as in claim 3 wherein the rubber therein is vulcanized.

8. The composition as in claim 4 wherein the rubber therein is vulcanized.

FREDERICK H. UNTIEDT.